Feb. 6, 1951             F. BERG             2,540,160

MACHINE FOR AND METHOD OF MANUFACTURING BRUSHES

Filed July 24, 1947             4 Sheets-Sheet 1

INVENTOR
FREDERICK BERG

BY
ATTORNEYS

Feb. 6, 1951 F. BERG 2,540,160
MACHINE FOR AND METHOD OF MANUFACTURING BRUSHES
Filed July 24, 1947 4 Sheets-Sheet 2

INVENTOR
FREDERICK BERG
BY
Bartlett Eyre Keel & Weymouth
ATTORNEYS

Feb. 6, 1951          F. BERG          2,540,160
MACHINE FOR AND METHOD OF MANUFACTURING BRUSHES
Filed July 24, 1947          4 Sheets-Sheet 3
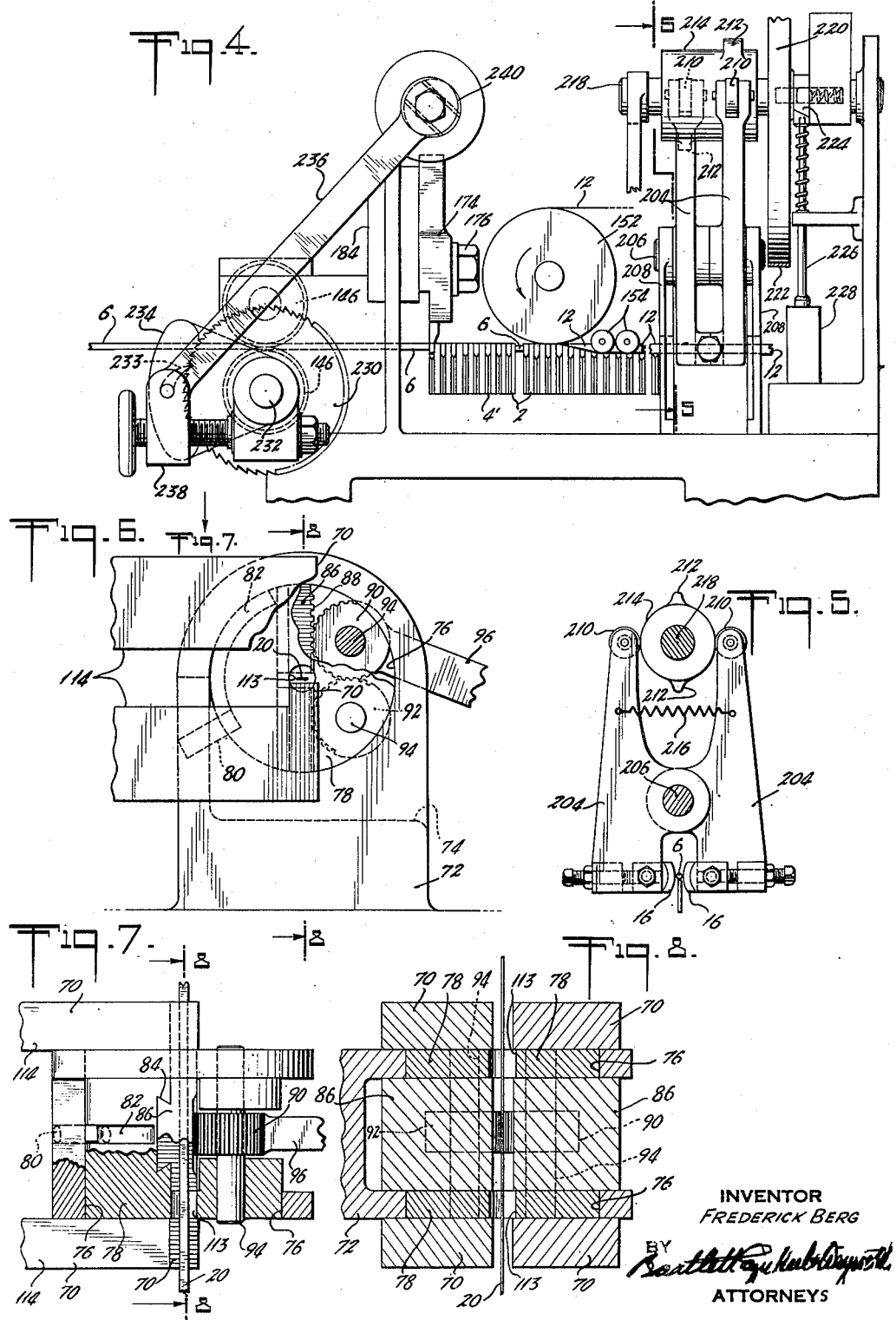
INVENTOR
FREDERICK BERG
BY
ATTORNEYS Feb. 6, 1951 F. BERG 2,540,160
MACHINE FOR AND METHOD OF MANUFACTURING BRUSHES
Filed July 24, 1947 4 Sheets-Sheet 4
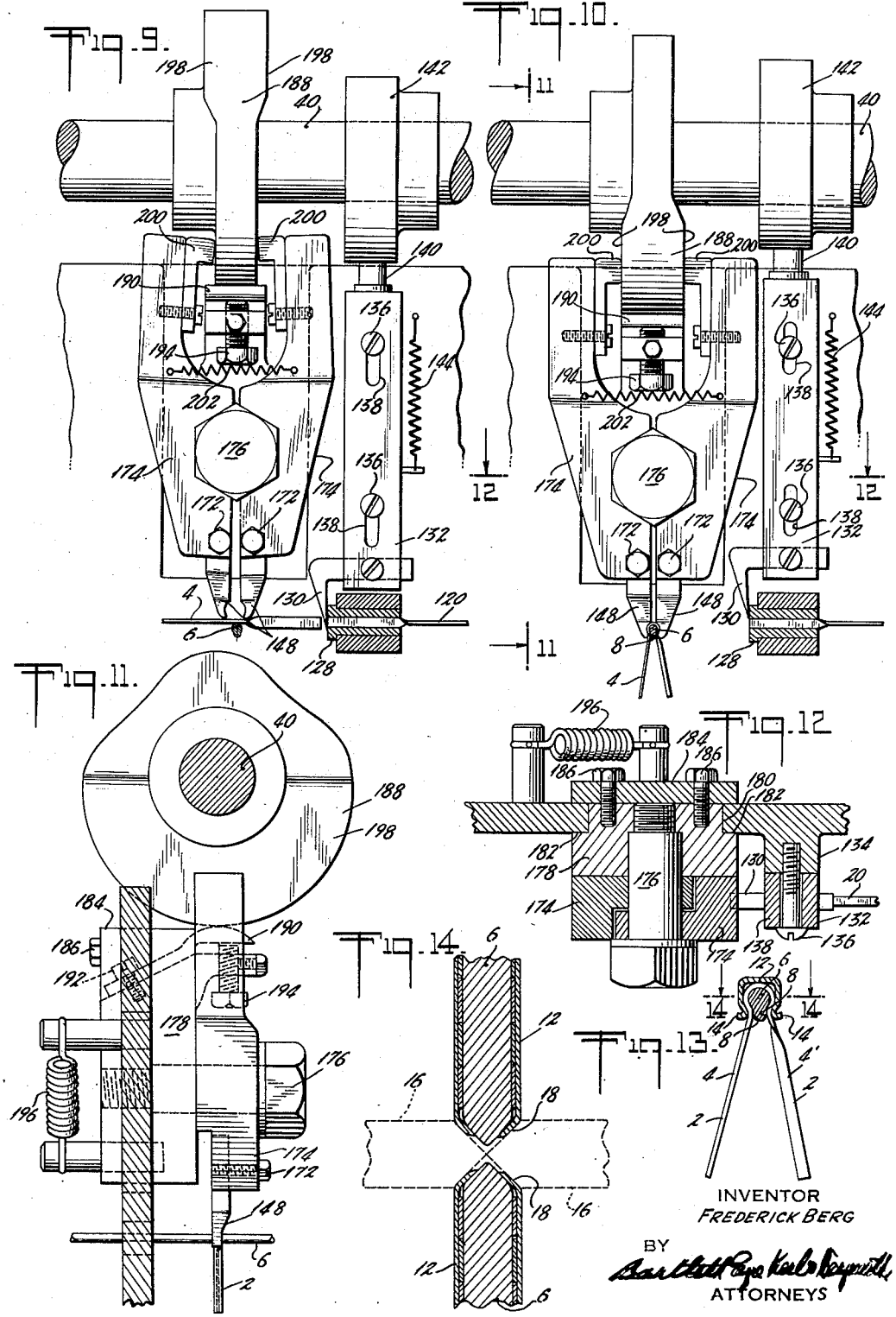
INVENTOR
FREDERICK BERG
BY
ATTORNEYS Patented Feb. 6, 1951

2,540,160

UNITED STATES PATENT OFFICE 2,540,160

MACHINE FOR AND METHOD OF MANUFACTURING BRUSHES

Frederick Berg, New Britain, Conn., assignor to The American Hardware Corporation, New Britain, Conn., a corporation of Connecticut Application July 24, 1947, Serial No. 763,258

16 Claims. (Cl. 300—2)

The present invention relates to machines for and methods of manufacturing brushes, especially brushes for use in floor scrubbing or scraping machines.

One of the objects of the invention is to provide a machine of this character which is simple in construction and efficient in operation.

Another of the objects of the invention is to provide a novel and improved method of manufacturing brushes of the character indicated.

The several features of the invention, whereby these and other objects may be attained, will be readily understood from the following description and accompanying drawings, in which:

Fig. 4 is a rear end view of the machine;

Fig. 5 is a sectional view taken on the line 5—5 of Fig. 4;

Fig. 6 is a view corresponding to a portion of Fig. 3, on an enlarged scale, and with certain parts broken away;

Fig. 7 is a sectional plan view of the same;

Fig. 8 is a sectional view taken on the line 8—8 of Figs. 6 and 7;

Fig. 9 is a view on an enlarged scale corresponding to a portion of Fig. 1 but with certain parts shown in a different position;

Fig. 10 is a similar view with the parts shown in substantially the position as shown in Fig. 1;

Fig. 11 is a sectional view taken on the line 11—11 of Fig. 10;

Fig. 12 is a sectional view, partly in elevation, taken on the line 12—12 of Fig. 10;

Fig. 13 is a transverse sectional view of a brush or brush strip which may be produced by my improved machine; and Fig. 14 is a sectional view on an enlarged scale, taken on the line 14—14 of Fig. 13 with portions of the cutting blades for severing the brush strip shown by dotted lines.

Figure 1:
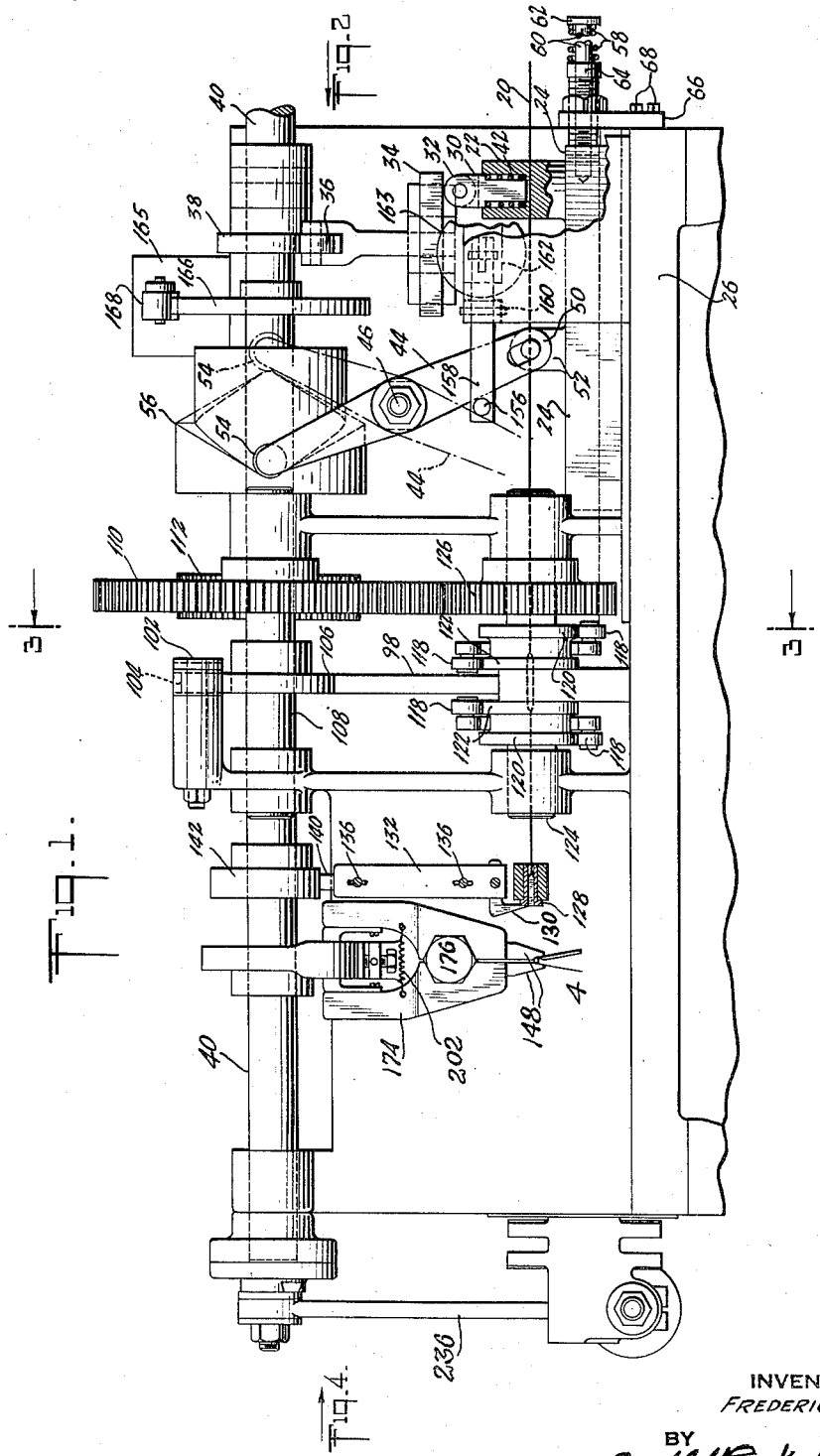
Figure 1 is a side view, with certain parts broken away and partly in section, of a machine embodying the features of the invention in their preferred form.
Figure 2:
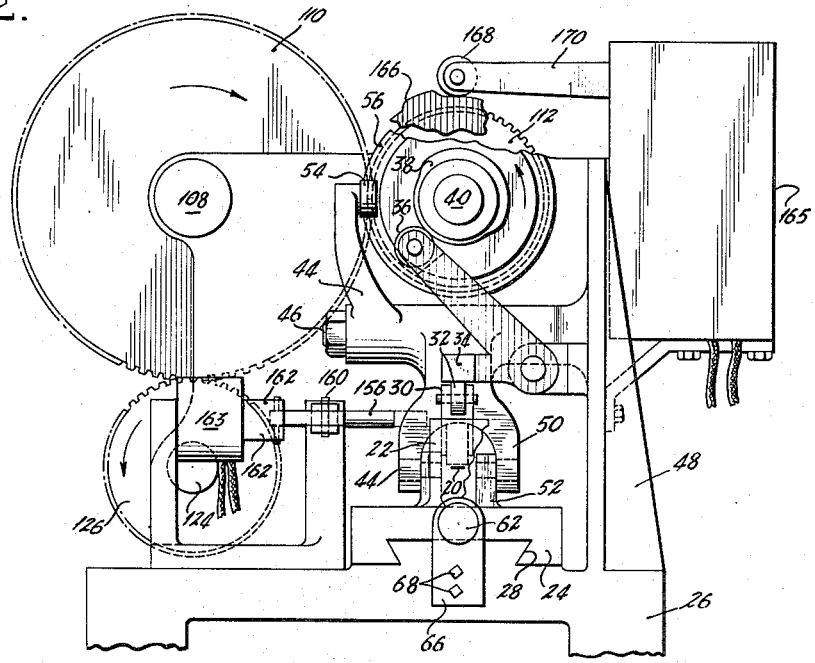
Fig. 2 is a front end view of the same with certain parts broken away.

The machine illustrated in the drawings is particularly adapted for use in manufacturing brush strips for use in floor machines of the type of the one described and claimed in my pending application Serial No. 680,979, filed July 2, 1946.

This brush strip as illustrated (Figs. 4 and 13) is provided with bristles 2 which are made in pairs. The bristles of each pair are formed from a length of flat wire or strip 4 that is bent over a support wire or core 6, the bristle lengths being arranged side by side on the core. Each strip or bristle length 4 has one of the bristle portions thereof twisted at 4' a quarter turn, the twisted bristles at each side of the brush being alternately arranged as shown. In applying the bristle lengths to the support wire or core 6 they are preferably bent sufficiently around the core to provide portions 8 in clinching engagement with the under side of the upper portion of the core. The lower portion of the core 6 is shaped as shown in Fig. 13 to cause the bristles to be inclined outwardly from the bent portions 8. After the bristles are thus applied to the core, a backing strip 12 is bent over the bristle length and core with its lower edges 14 bent inwardly and then outwardly so as to securely clamp the bristles to the core, the bending of said lower edges outwardly permitting free flexing of the bristles adjacent said edges.

In applying the bristle lengths 4 to the core a predetermined number are applied and then a space corresponding to the width of a bristle is left between the last bristle length as applied and the succeeding length, the clamping strip 12 extending over this space as well as over the lengths applied. After said predetermined number of bristles have thus been applied to the core and the clamping strip applied, the clamping strip and core are severed centrally of said space whereby a bristle length is omitted so that predetermined length brush strips are produced, the machine being adapted to be adjusted to vary the lengths of the brush strips.

In cutting off the brush strips, knives 16 may be employed (Figs. 5 and 14) which have V-shaped cutting edges so that as each brush strip is cut off, the severed ends 18 of the backing strips 12 are bent inwardly over the severed ends of the support cores 6, thus securely holding the backing strip and bristles in place at each end of the brush strip.

The bristle lengths 4 are formed from a flat wire or strip 20 which may be fed into the machine from any suitable source of supply. This strip 20 passes through a guide slot in a boss 22 that is formed on a carriage 24 mounted to slide on the base 26 of the machine, the carriage 24 and the base 26 having a dove-tailed sliding connection 28 between them. Mounted in a vertical socket in the boss 22 is a clamping member 30 which is adapted to be pressed downwardly so as to cause its lower end to clamp the strip 20 to the bottom of the socket and guide slot by means of a roller 32 on the upper end of the clamping member which is engaged by an arm 34 of a cam lever, the other arm of which carries a cam roll 36 which engages a cam 38 carried by a cam shaft 40. The clamping member 30 is pressed upwardly so as to release the strip 20 and to maintain its roller 22 against the underside of the cam arm 34 by means of a spring 42 coiled about the clamping member and interposed between a shoulder thereon and a shoulder in the socket in the boss 22.

During the operation of the machine, the carriage 24 is reciprocated longitudinally, the cam arm 34 being of sufficient width to allow the roller 32 to ride on the underside thereof during the reciprocation of the carriage. During the advancing movement of the carriage, the cam 38 through the roller 32 causes the clamping member 30 to clamp the strip 20 to the carriage and thus to cause the strip to be fed therewith. At the completion of such advancing movement of the carriage, the cam 38 releases the clamping member 30 so as to permit the spring 42 to raise the member 30 out of clamping engagement with the strip, so that during the return movement of the carriage the clamping member is free of the strip.

The feed carriage 24 is thus reciprocated by means of a lever 44 which is pivoted on a bolt 46 on a bracket 48 of the machine frame, and has its lower end 50 bifurcated and pivotally connected with upstanding lugs 52 on the feed carriage. The other arm of the lever 44 carries a cam roller 54 which engages a cam 56 carried by the cam shaft 40.

The cam roller 54 is maintained in engagement with the cam 56 by means of a spring 58 which is coiled about a rod 60 and interposed between a head or flange 62 on the end of the rod and a sleeve 64 through which the rod extends. The end of the rod is secured in a socket in the front end of the feed carriage 24. The sleeve 64 is screw-threaded through an aperture in a bracket member 66 which is secured to the front end of the frame by bolts 68.

During the feeding movement of the carriage 24 the spring 58 is tensioned and serves to return the carriage to its forward position until the end of the carriage abuts the end of the sleeve 64. By adjustment of the sleeve 64 the length of the return movement of the carriage may be adjusted as desired.

The strip 20 passes from the boss 22 through a twisting device. This device comprises two pairs of clamping jaws 70 which are arranged at opposite sides of a standard 72 on the base of the machine (Figs. 1, 3, 6, 7, and 8) the standard being transverse of the base. The strip 20 passes between the jaws of the first pair, then through the standard, and as it leaves the standard passes between the jaws of the other pair.

The standard 72 has a cutaway portion or recess 74 therein and the side walls of the recess are provided with circular apertures 76. Mounted to turn in these apertures are the ends of a block 78, the block being guided by a pin 80 which extends through an aperture in the standard 72 and has its end extending into a slot 82 in the circular portion of the block, the turning movement of the block being limited by the engagement of the end walls of the slot 82 with the pin 80.

The block 78 is provided with a cutaway portion forming dove-tailed guideways 84 for two clamping members 86 which are adapted to move toward and from each other to grip and release the bristle strip 20. These members are thus moved by means of rack teeth 88 on the outer sides thereof which are engaged by intermeshing pinions 90 and 92 respectively, which are mounted on stud shafts 94 journaled in bearings in the block 78. The segmental pinion 90 is adapted to be turned so as to turn the pinion 92 and thus move the clamping members 86 toward and from the bristle strip 20, by means of an arm 96 projecting therefrom and connected through a link 98 with a cam lever 100 pivoted at 102 on the machine frame and carrying a cam roll 104 which is engaged by a cam 106 carried by a shaft 108 which is driven from the main cam shaft 40 through a large gear 110 secured thereon which is operatively engaged by a gear 112 secured on the shaft 40. The side walls of the cutaway portions of the block 78 are provided with circular clearance slots 113 for the strip 20.

As the clamping members 86 grip the bristle strip 20, the strip is gripped at opposite sides of said members by the two pairs of gripping jaws 70. When this occurs the arm 96 of the upper segmental pinion 90 is further turned by the cam 106 so as to impart a quarter turn to the cylindrical block 78, and thus cause the strip 20 to be twisted between the pair of clamping members 86 and the two pairs of clamping jaws 70, thus forming the twists 4' (Fig. 13) in the completed bristle lengths. The clamping members 86 are then opened to release the strip and the block 78 is returned to its initial position (Fig. 6). At this time also, the two pairs of clamping jaws 70 open so as to release their grip on the strip enabling the next intermittent feeding movement of the strip to take place.

Figures 2A, 3:
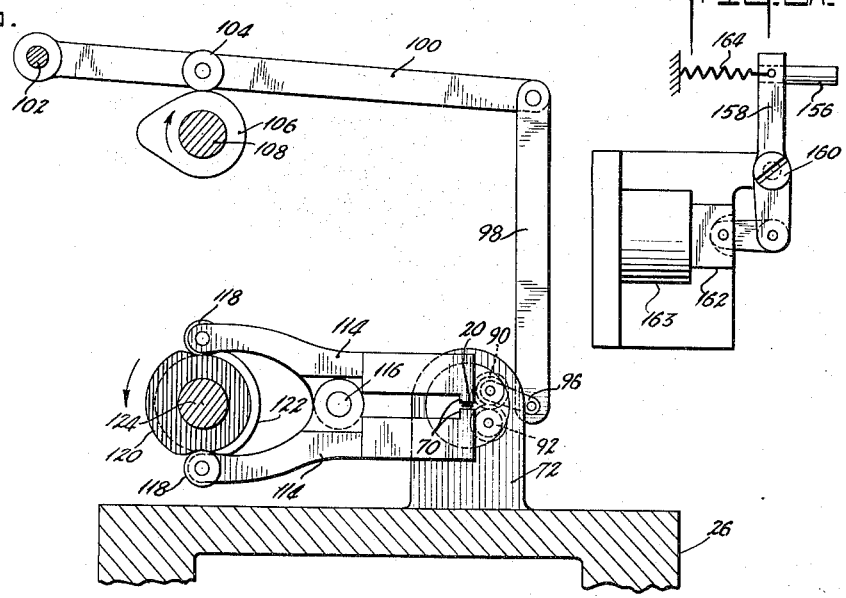
Fig. 2a is a detail plan view of a portion of the machine illustrated in Fig. 2.
Fig. 3 is a sectional view taken substantially on the line 3—3 of Fig. 1.

The jaws of each pair of clamping jaws 70 are formed on the ends of levers 114 which are pivoted at 116 and their outer arms carry cam rolls 118 which respectively engage cams 120 and 122 carried by a shaft 124 which is driven from the large gear 110 by a gear 126 secured thereon (Figs. 1 and 3). The strip after leaving the twisting device passes through a cutting sleeve 128, over the rear end of which a cutting knife 130 is mounted to work so as to sever the strip. This point of severance of the strip is spaced from the center of the clamping surface of the clamping members 86, a distance corresponding to twice the length of the bristle length to be formed, and the cutting knife 130 is operated so as to sever the strip midway between the ends of each twisted or flattened portion and midway between the centers of adjacent flattened portions so as to form the bristle lengths as above described.

The cutting off knife 130 is secured on the lower end of a bar 132 which is mounted to slide vertically on a bearing 134 on the machine frame, it being guided by means of screws 136 which extend through elongated slots 138 therein and are screw-threaded in the bearing 134.

The knife-carrying bar 132 is forced downwardly so as to sever the bristle strip by means of a cam follower 140 on the upper end of the bar which engages a cam 142 on the cam shaft 40, the follower 140 being maintained in engagement with the cam by means of a coiled spring 144 which has one end secured to the bar and the other to the machine frame.

As the advancing end of the bristle strip is moved into position to be severed by the knife 130 to form a bristle length, it extends centrally over the support wire or core 6 which is intermittently fed into the machine by means of feed rollers 146. As a bristle length is cut off which occurs during a period of rest of the feeding of the core 6, forming jaws 148 move downwardly into engagement with the severed bristle length and centrally bend the length about the upper portion of the core 6 with the inwardly bent portions 8 thereof clinched beneath the upper portion of the core, the bristles being inclined outwardly by engagement with the sides of the lower portion of the core (Figs. 9, 10, 11 and 13). The forming jaws 148 then open and are retracted from the bristle length and core. The next feeding movement of the core places the core in position to similarly receive the next bristle length that is cut off from the strip 20, and the forming jaws act to bend this bristle length about the core 6 in the same manner as was done with the first bristle length as described. This operation is repeated until the desired number of bristle lengths have been applied to the core 6, the feeding of the core 6 being such that the bristle lengths are laid edge to edge on the core.

When a desired number of bristle lengths have been thus applied to the core, the feeding and cutting off of one bristle length is interrupted before the operation is repeated to again apply a predetermined number of lengths to the core. During this interruption, the continued feeding of the core 6 for one intermittent movement results in a space being left on the core 6 where a bristle length is omitted. Thus the bristle lengths are applied to the core in groups, each group containing a predetermined number of lengths, and the groups being spaced apart on the core.

During the operation of applying the bristle lengths to the core, the continued intermittent movement of the core causes it to pass beneath a backing strip 12 which is fed into the machine by means of a roller 152. The backing strip is then acted upon by any suitable forming means, such as the rollers 154, to bend the backing strip about the bristle lengths and core, as illustrated in Fig. 13. As the backing strip, bristle lengths and core leave the forming rollers 154, they pass beneath the cutting knives 16 which sever the brush or brush strip thus formed at each space where a bristle length is omitted as above described.

The means for interrupting the feeding of the strip for one bristle length as described, is accomplished by devices which render the cam operated lever 44 inoperative so as to interrupt the operation of the feed carriage 24 one complete reciprocating movement thereof. As shown, this means comprises a stop pin 156 which is secured on the end of an arm of a lever 158 which is hinged on a pin 160, and its other arm is adapted to be operated through connection with the core 162 of a solenoid 163. Upon energizing this solenoid while the feed carriage and lever 44 are at the limit of an advancing movement thereof, the lever 158 is turned so as to position the stop pin 156 in front of the lower arm of the lever 44, thus preventing the spring 58 from effecting a return movement of the carriage. When the solenoid is deenergized, a spring 164 having one end connected to the lever 158 returns the lever to its initial position and thus moves the stop pin out of the normal path of movement of the lever 44, allowing the spring 58 to move the carriage on its return stroke and the cam roll 54 to again effect the next advancing movement of the carriage to feed the strip. The solenoid 163 may be thus energized and deenergized through any suitable timing device 165 that may be controlled by a cam disk 166 carried by the cam shaft 40 and engaged by a roller 168 on a control lever 170 of the timing device.

As shown, the forming jaws 148 are secured by means of bolts 172 on the lower ends of levers 174 (Figs. 9 to 12). These levers are pivoted on a bolt 176 which is screw-threaded into a block 178 that is mounted to slide in a guideway 180 on the machine frame, the block 178 having shoulders 182 engaging one side of the frame and a plate 184, secured to the block 170 by bolts 186, engaging the other side of the frame.

The forming jaws 148 are forced downwardly and closed to bend the strip lengths about the core 6 by means of a cam 188 carried by the shaft 40. The peripheral surface of this cam engages a cam follower 190 which is pivotally mounted on a screw 192 secured to the carrier block 178, and adjustably held in position by means of a set screw 194 engaging the underside of the follower. During the rotation of the cam 188, it acts through the cam follower 190 to impart the desired downward movement to the gripping jaws 148, the return movement of the jaws being effected by means of a coiled spring 196 having one end connected to the carrier block 178 and its other end secured to the machine frame.

The sides of the cam 188 have raised portions 198 which engage follower members 200 secured to the upper ends of the jaw-carrying levers 174 for closing the jaws 148 as they are moved downwardly so as to bend the bristle lengths about the core 6, the jaws being returned to their open position by means of a spring 202.

The cutting-off knives 16 are secured on the lower ends of levers 204 which are pivotally mounted on a stud shaft 206 secured in brackets 208 on the machine frame (Figs. 4 and 5). The upper ends of these levers carry cam rollers 210 which are respectively held in the path of cam projections 212 on a cam 214 by means of springs 216 connecting with the levers 204. The cam 214 is secured on a shaft 218 on which a fly-wheel 220 is mounted to turn, the fly-wheel being driven as by a belt 222. The shaft 218 is adapted to be connected with the fly-wheel by means of a one revolution clutch 224 which may be operated through a rod 226 by means of a solenoid 228. This solenoid may be controlled by the electrical timing device 165 that controls the operation of the feed carriage 24 as above described or by any other suitable timing device, so as to sever the brush strips at the desired points as above described.

The feed rollers 146 for intermittently feeding the support wire or core 6 may be driven through any suitable intermittent feeding device comprising the ratchet wheel 230 which is secured on a shaft 232 that carries the lower feed roll 146. This ratchet wheel is operated to intermittently turn the lower roll 146 and through frictional engagement or intermeshing gears, to simultaneously turn the upper roll 146 by means of a pawl 233 engaging the teeth of the ratchet wheel. The pawl 233 is mounted on a segmental disk or arm 234 that is operated by means of a rod 236 having one end pivotally connected through adjusting block 238 with the arm 234, and its other end embracing an eccentric 240 carried by the rear end of the shaft 40.

It will be apparent that my improved machine is simple in construction, and capable of uniformly and expeditiously producing articles of the desired construction as above described.

As will be evident to those skilled in the art my invention consists of various modifications without departing from the spirit thereof or the scope of the appended claims.

What I claim is:

1. In a machine for use in making brushes of the class described, the combination of means for feeding longitudinally a flattened wire from which the bristles of the brushes are to be made, means for twisting the wire at spaced intervals so as to successively provide substantially flat portions of predetermined length at an angle to the body of the wire, the centers of said flat portions being spaced apart a distance corresponding to twice the length of the bristles to be formed, means for successively cutting off bristle lengths from the ends of the wire, the points of severance being at the centers of said flat portions and midway between the centers of adjacent flat portions, means for feeding a support core longitudinally, and devices for successively bending each bristle length centrally over said support core with the several lengths arranged side by side on the core.

2. In a machine for use in making brushes of the class described, the combination of means for intermittently feeding longitudinally a flattened wire from which the bristles of the brush are to be made, devices acting during alternative periods of rest of the feeding of the wire to grip the wire at spaced points and twist the portion of the wire between said points so as to successively provide substantially flat portions arranged at an angle to the body of the wire and spaced apart, the centers of said flat portions being spaced apart a distance corresponding to twice the length of the bristles to be formed, and devices for successively cutting off bristle lengths from the advancing end of the wire, the points of severance of the wire being at the centers of said flat portions and midway between the centers of adjacent flat portions.

3. In a machine for use in making brushes of the class described, the combination of means for longitudinally feeding intermittently a wire from which the bristles of the brushes are to be made, pairs of gripping jaws adapted during alternate periods of rest of the feeding of the wire to grip the wire at spaced points, means for thus operating said gripping jaws, gripping members adapted when the wire is thus gripped by said gripping jaws to grip the portion of the wire between the points of engagement of said pairs of gripping jaws and then to be turned about the longitudinal axis of the wire to twist said portion of the wire so as to successively provide substantially flat portions at an angle to the body of the wire, means for thus operating said gripping members, and devices for successively cutting bristle lengths from the advancing end of the wire, the points of severance of the wire being at the centers of said flat portions and midway between the centers of adjacent flat portions.

4. In a machine for use in making brushes of the class described, the combination of means for longitudinally feeding intermittently a wire from which the bristles of the brushes are to be made, pairs of gripping jaws adapted during alternate periods of rest of the feeding of the wire to grip the wire at spaced points, means for thus operating said gripping jaws, gripping members adapted when the wire is thus gripped to grip the portion of the wire between the points of engagement of said pairs of jaws, a carrier for said gripping members adapted to be oscillated about the axis of the wire, and means for operating said members to thus grip the wire and after a predetermined interval to release the wire, and for oscillating said carrier in timed relation to said operation of the gripping members whereby while said members grip the wire the carrier is turned in one direction to effect twisting of said portion of the wire and when said members are released from the wire the carrier is turned in the opposite direction to return said members to their initial position.

5. A structure according to claim 4 in which the gripping members are mounted to slide in said carrier, and the means for operating said members and the carrier comprise intermeshing pinions mounted on the carrier, racks on said members respectively engaged by said pinions, an arm projecting from one of the pinions, and means for operating said arm first to turn the pinions to cause said members to grip the wire and then to turn the carrier to effect twisting of the wire.

6. In a machine for use in making brushes of the class described, the combination of means for feeding a wire longitudinally, means for successively cutting off bristle lengths from the advancing end of the wire, means for feeding a support core longitudinally transversely of the feeding of the wire, each bristle length being centrally positioned over the core when it is cut off, and devices for centrally bending each bristle length over said core, the several lengths being arranged side by side on the core.

7. In a machine for use in making brushes of the class described, the combination of means for longitudinally feeding a wire intermittently, means for successively cutting off bristle lengths from the advancing end of the wire during periods of rest of the feeding of the wire, each bristle length corresponding to the length of the feeding movement of said feeding means, means for intermittently feeding a support core transversely of the wire, each bristle length being centrally positioned over the core, and devices for centrally bending each bristle length over the core, the length of each feeding movement of the core being such as to cause the bristle lengths to be applied thereto side by side in close proximity.

8. A structure according to claim 7 in which means is provided for interrupting the feeding of the wire for a predetermined interval after application of a predetermined number of bristle lengths thereto so as to cause the bristle lengths to be applied in groups, each group containing a predetermined number of lengths, and the several groups being spaced apart.

9. A structure according to claim 6 in which the devices for bending each bristle length over the core comprise forming jaws, levers on the lower end of which said jaws are mounted, a carrier for the levers mounted to slide vertically, means for moving the carrier downwardly to cause the ends of the jaws to engage the bristle length and bend it over the core, and means for thus operating the levers to cause the jaws to close to clinch the bristle length about the core.

10. A structure according to claim 6 in which the devices for bending each bristle length over the core comprise forming jaws, levers on the lower ends of which said jaws are mounted, a carrier for the levers mounted to slide vertically, and means comprising a cam for moving the carrier downwardly to cause the ends of the jaws to engage the bristle length and bend it over the core, and for then operating the levers to clinch the bristle length about the core, and means for returning the carrier and the levers to their retracted positions after such application of the bristle lengths to the core.

11. In a machine for use in making brushes of the class described, the combination of means for longitudinally feeding a wire intermittently, means for successively cutting off bristle lengths from the advancing end of the wire during periods of rest of the feeding of the wire, means for intermittently feeding a support core transversely of the wire, each bristle length being centrally positioned over the core, devices for centrally bending each bristle length over the core whereby the bristle lengths are arranged on the core in groups that are spaced apart, each group having a predetermined number of bristle lengths arranged side by side on the core, means for applying a backing strip over the bent portions of the bristle lengths and the core, and means for successively severing the backing strip and the core between adjacent groups.

12. A structure according to claim 7 in which the feeding means for the wire comprises a carriage mounted to slide longitudinally, a clamping member mounted on the carriage adapted to be forced downwardly to clamp the wire to the carriage, a lever for holding said member in clamping engagement with the wire during the advancing movement of the carriage and releasing said member near the limit of said movement of the carriage, and a spring for moving said clamping member out of clamping engagement with the wire when said member is released.

13. A structure according to claim 7 in which the feeding means comprises a carriage adapted to be reciprocated longitudinally, a clamping device carried by the carriage for clamping the wire to the carriage during the advancing movement of the carriage and releasing the wire during the retracting movement of the carriage, means for thus reciprocating the carriage comprising a lever having one end pivotally connected with the carriage, a cam engaging the other end of said lever for moving the carriage in one direction, and a spring for moving the carriage in the opposite direction and for maintaining the end of said lever in operative engagement with the cam, and means acting automatically when a predetermined number of bristle lengths have been applied to the core for holding said lever out of operative engagement with the cam at the completion of the movement of said carriage in said first mentioned direction, and for allowing the cam and said lever to operatively re-engage after such interruption of the operation of said carriage for one complete cycle thereof.

14. A method for use in making brushes of the class described which comprises intermittently feeding longitudinally a flattened wire from which the bristles of the brush are to be made, gripping the wire at spaced points and twisting the portion of the wire between said points so as to successively provide substantially flat portions at an angle to the body of the wire, the centers of said flat portions being spaced apart corresponding to twice the length of the bristles to be formed, and successively severing the advancing end of the wire at the centers of said flat portions and midway between the centers of adjacent flat portions.

15. A method for use in making brushes of the class described which comprises longitudinally feeding a wire from which the bristles of the brushes are to be made, twisting spaced portions of the wire to provide flat portions at an angle to the body of the wire, the centers of said flat portions being spaced apart corresponding to twice the length of the bristles to be formed, successively severing the wire at the centers of said flat portions and midway between the centers of adjacent flat portions to form bristle lengths, intermittently feeding a core longitudinally transversely of the feeding of said wire so as to cause the core at each period of rest of the feeding movement thereof to be positioned centrally of the ends of each bristle length as it is cut off, and then bending each bristle length centrally about the core so as to cause the bristle lengths to be arranged side by side on the core.

16. The method according to claim 15 in which the bristle lengths are so applied to the core as to be arranged in groups, each group containing a predetermined number of bristles and the several groups being spaced apart on the core, applying a backing strip over the bent over portions of the bristle lengths and core, and severing the brush strips thus formed centrally through the spaces between adjacent groups.

FREDERICK BERG.

REFERENCES CITED

The following references are of record in the file of this patent:

UNITED STATES PATENTS

| Number | Name | Date |
| --- | --- | --- |
| 1,153,738 | Van Devoorde | Sept. 14, 1915 |
| 1,309,660 | Smith | July 15, 1919 |
| 1,557,166 | Horn | Oct. 13, 1925 |
| 1,649,310 | Joline | Nov. 15, 1927 |
| 1,871,775 | Cave | Aug. 16, 1932 |
| 1,988,822 | Weissenborn | Jan. 22, 1935 |

FOREIGN PATENTS

| Number | Country | Date |
| --- | --- | --- |
| 10,615 | Great Britain | July 3, 1897 |